US007329456B2

(12) United States Patent
Tilton et al.

(10) Patent No.: US 7,329,456 B2
(45) Date of Patent: Feb. 12, 2008

(54) METHOD OF FABRICATION OF AN ACOUSTICAL SUBSTRATE INTO A THREE DIMENSIONAL PRODUCT

(75) Inventors: Jeffrey A. Tilton, Prospect, KY (US); Clarke Berdan, II, Granville, OH (US); Jerry M. Parks, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 451 days.

(21) Appl. No.: 10/936,082

(22) Filed: Sep. 8, 2004

(65) Prior Publication Data

US 2005/0139415 A1 Jun. 30, 2005

Related U.S. Application Data

(63) Continuation-in-part of application No. 10/749,087, filed on Dec. 30, 2003.

(51) Int. Cl.

| | |
|---|---|
| ***B32B 7/02*** | (2006.01) |
| ***E04F 17/04*** | (2006.01) |
| ***E04B 1/82*** | (2006.01) |
| ***E04B 9/00*** | (2006.01) |
| ***E04B 1/343*** | (2006.01) |
| ***B31B 1/25*** | (2006.01) |

(52) U.S. Cl. ...................... 428/212; 181/224; 181/284; 181/287; 493/51; 493/59; 493/69; 493/79; 493/143

(58) Field of Classification Search .................. 493/51, 493/59, 68, 69, 79, 143; 428/212; 181/224, 181/284, 287

See application file for complete search history.

(56) References Cited

U.S. PATENT DOCUMENTS

| | | | | |
|---|---|---|---|---|
| 3,078,880 | A | | 2/1963 | Stephens |
| 3,092,529 | A | | 6/1963 | Pearson |
| 3,529,516 | A | * | 9/1970 | Pullen et al. ................ 493/59 |
| 3,605,534 | A | | 9/1971 | Barr |
| 3,687,170 | A | | 8/1972 | Malone |
| 3,907,193 | A | * | 9/1975 | Heller ........................ 428/156 |
| 3,980,005 | A | * | 9/1976 | Buonaiuto .................. 427/289 |
| 4,122,911 | A | * | 10/1978 | Croup ........................ 181/199 |
| 5,032,443 | A | | 7/1991 | Rietdijk et al. |
| 5,310,594 | A | | 5/1994 | Holland et al. |
| 5,567,504 | A | | 10/1996 | Schakel et al. |
| 5,707,327 | A | * | 1/1998 | Carbone ...................... 493/59 |

(Continued)

*Primary Examiner*—Milton I. Cano
*Assistant Examiner*—David J. Joy
(74) *Attorney, Agent, or Firm*—Inger H. Eckert; Maria C. Gasaway

(57) ABSTRACT

A method of forming a box-like acoustical substrate is provided. Portions of an acoustical substrate having a decorative surface are compressed to form a flange, a first compressed region, a second compressed region, and a third compressed region. First, second, central, and third uncompressed regions are positioned respectively adjacent to the compressed regions. A left first surface and a right first surface of the acoustical substrate may be folded toward the back surface of the substrate until the second compressed region and the third compressed regions are flush with the central uncompressed region. An outer portion of the left surface may then be folded towards the back surface until the flange is flush with the right edge. The acoustical product may be used as an acoustical trap or duct. When the acoustical product is utilized as a duct, an air impermeable sheet may be positioned on the external surface.

16 Claims, 15 Drawing Sheets

U.S. PATENT DOCUMENTS

| | | | | |
|---|---|---|---|---|
| 5,783,268 | A | 7/1998 | Noonan et al. | |
| 6,270,865 | B1 | 8/2001 | Noonan et al. | |
| 6,321,871 | B1 * | 11/2001 | Russell | 181/295 |
| 2001/0031336 | A1 | 10/2001 | Born | |
| 2002/0025404 | A1 * | 2/2002 | Taber et al. | 428/118 |
| 2002/0159610 | A1 * | 10/2002 | Bank et al. | 381/152 |
| 2003/0068943 | A1 | 4/2003 | Fay | |

* cited by examiner

Fig. 1a
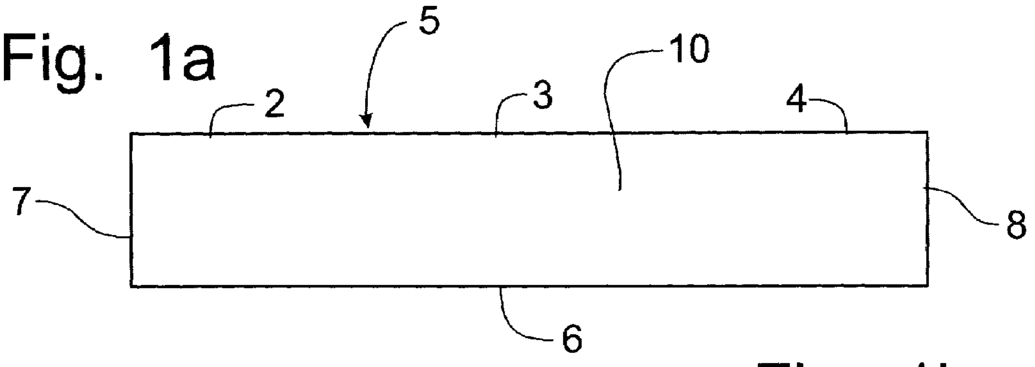
Fig. 1b
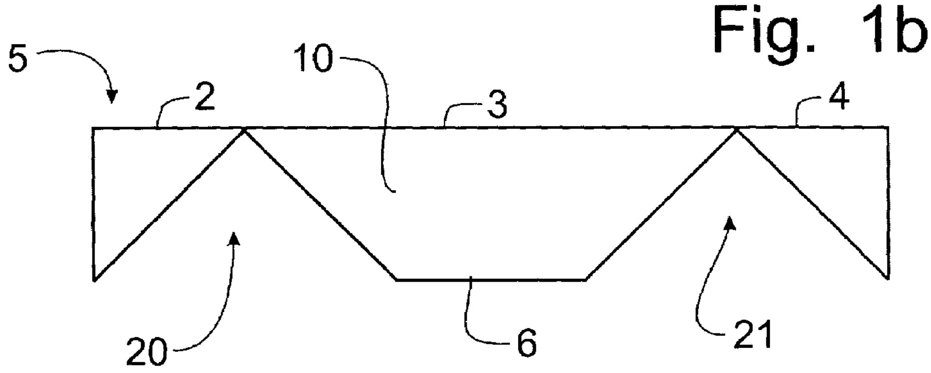
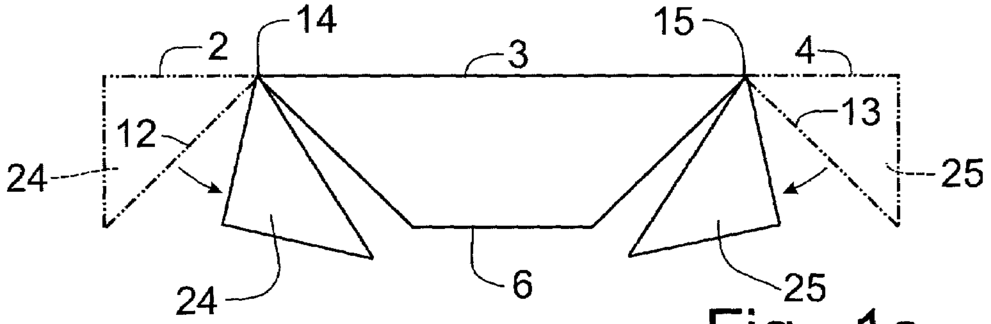
Fig. 1c
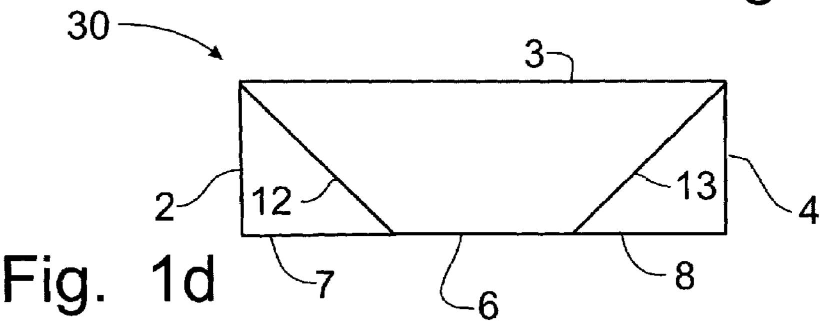
Fig. 1d

Fig. 2c
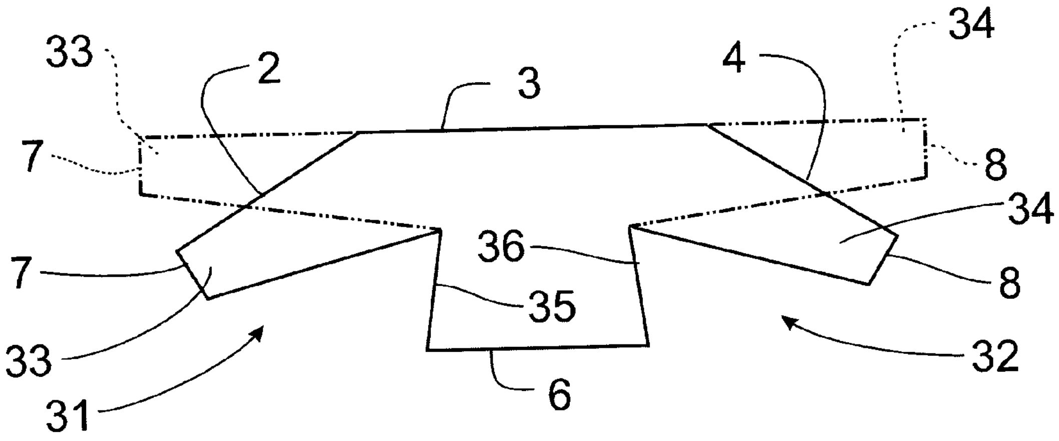
Fig. 2d
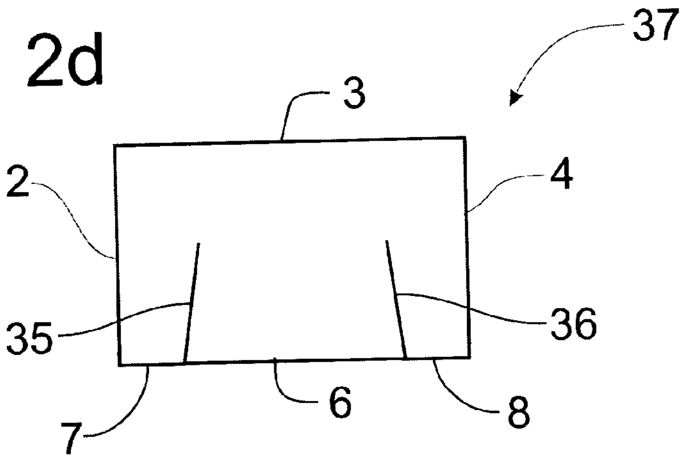
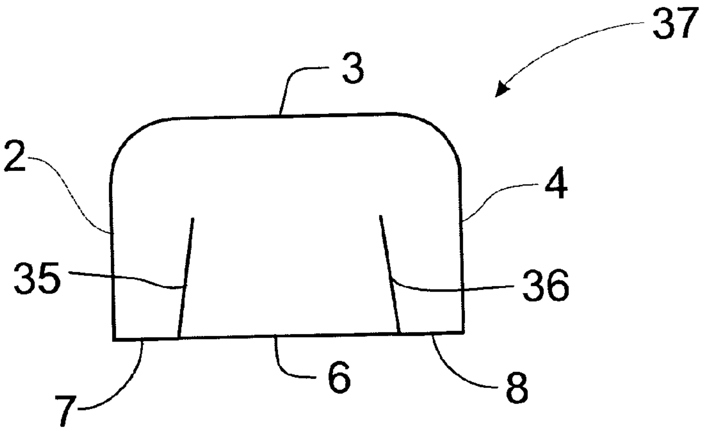
Fig. 2e

Fig. 3a
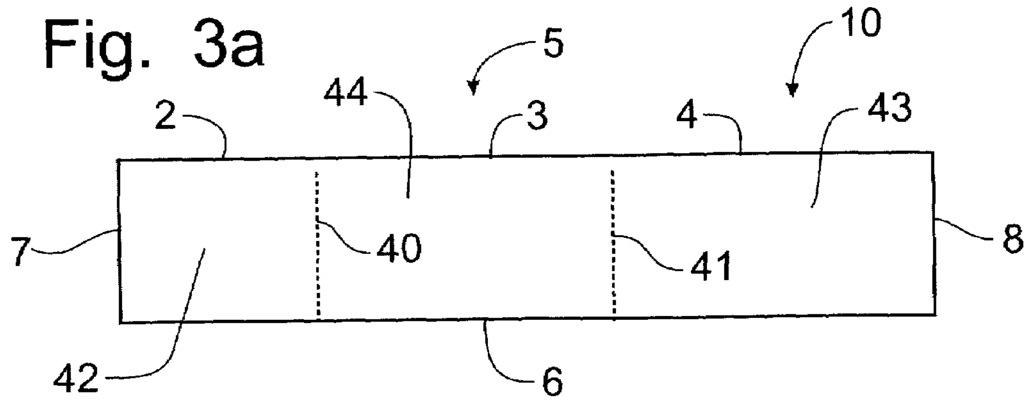
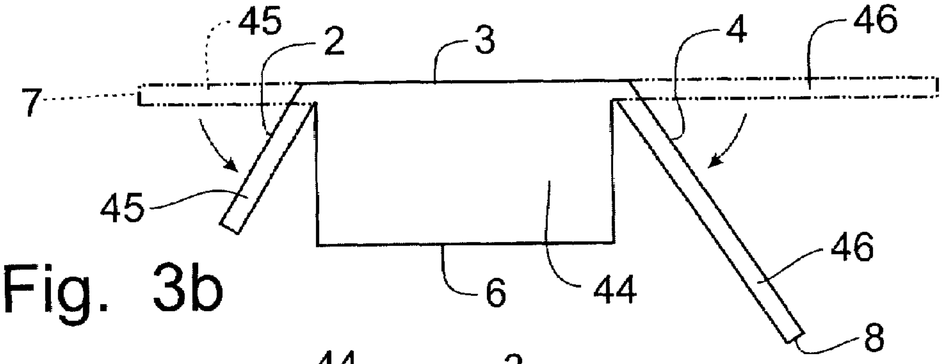
Fig. 3b
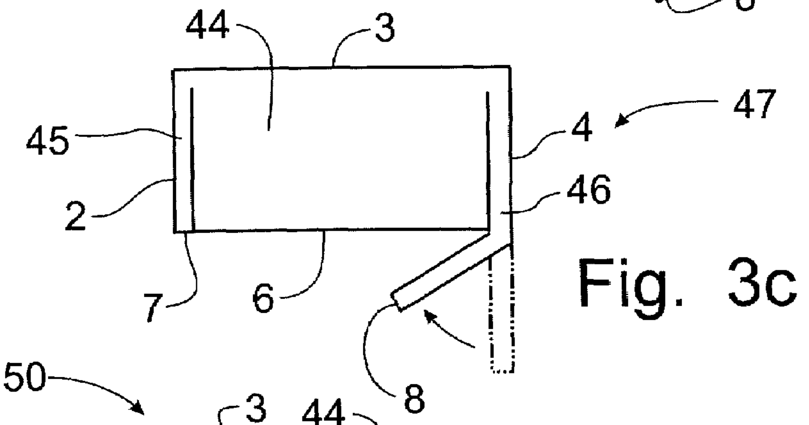
Fig. 3c
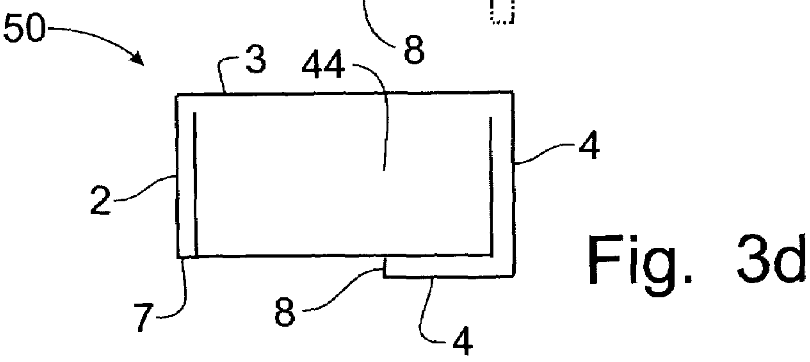
Fig. 3d

Fig. 4a
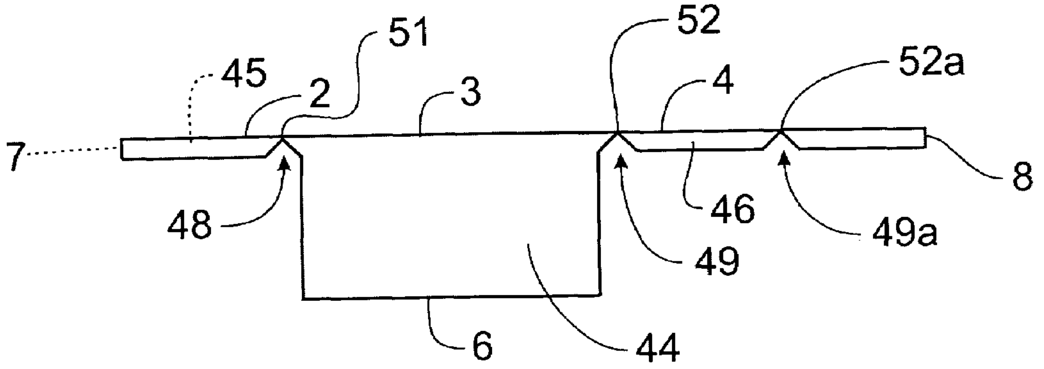
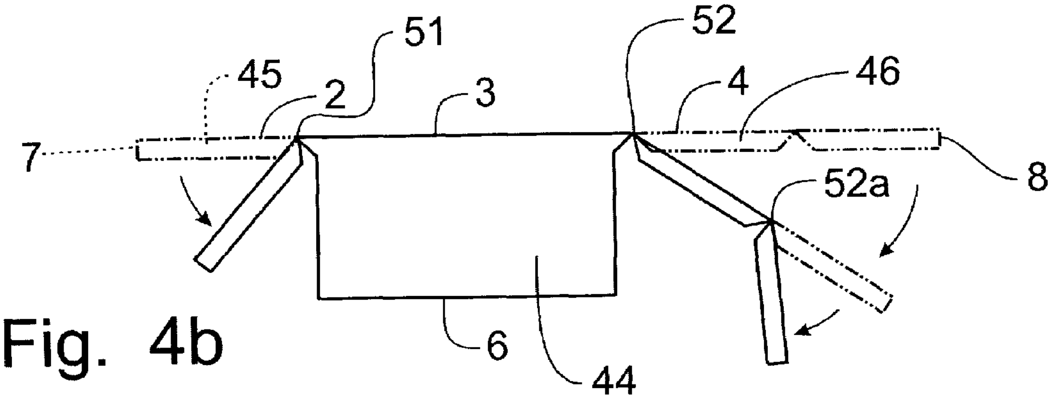
Fig. 4b

Fig. 5a
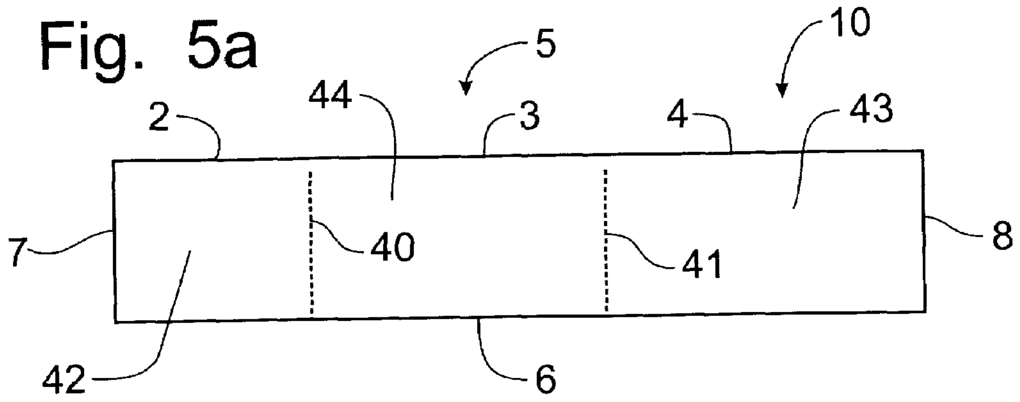
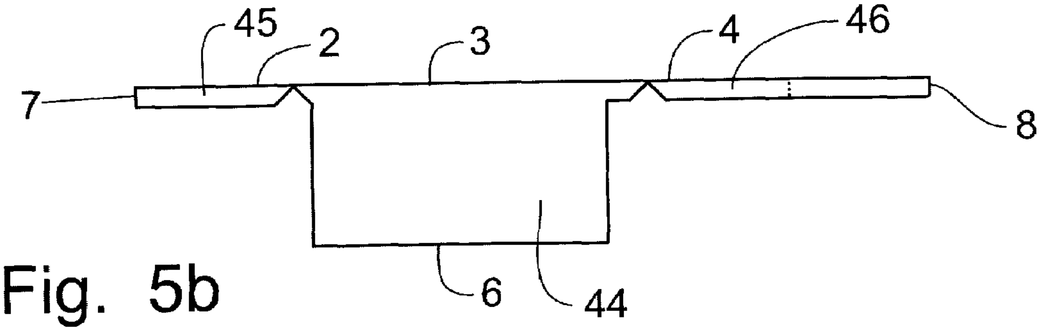
Fig. 5b
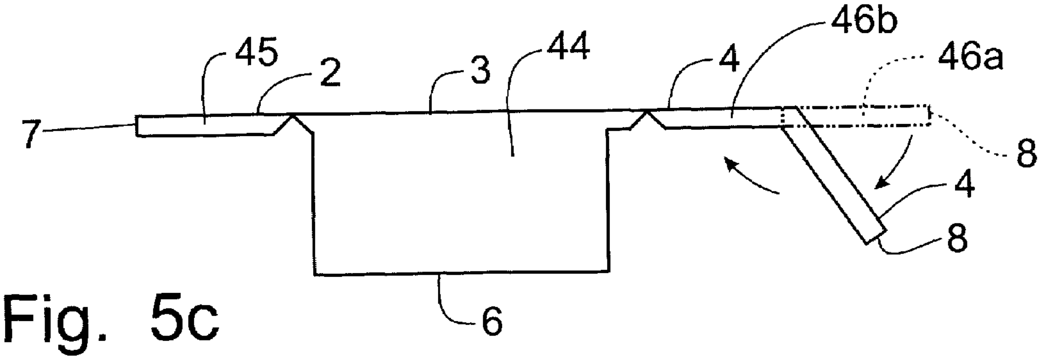
Fig. 5c

Fig. 5d
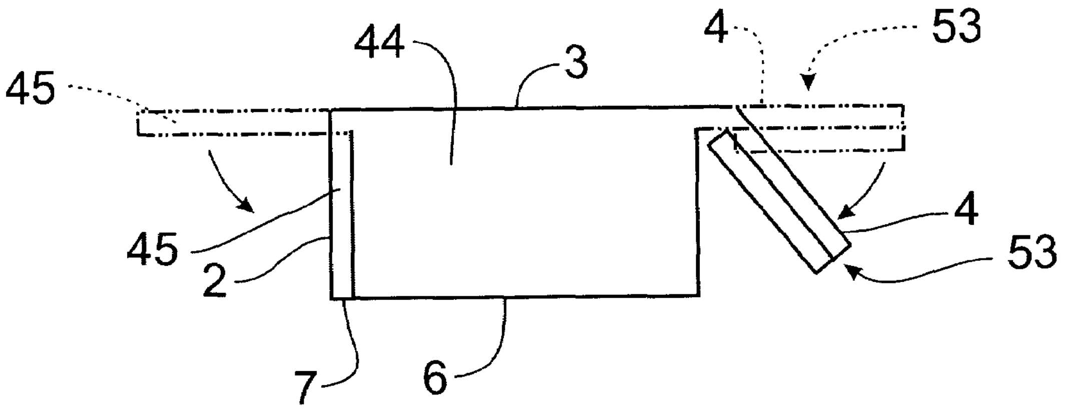
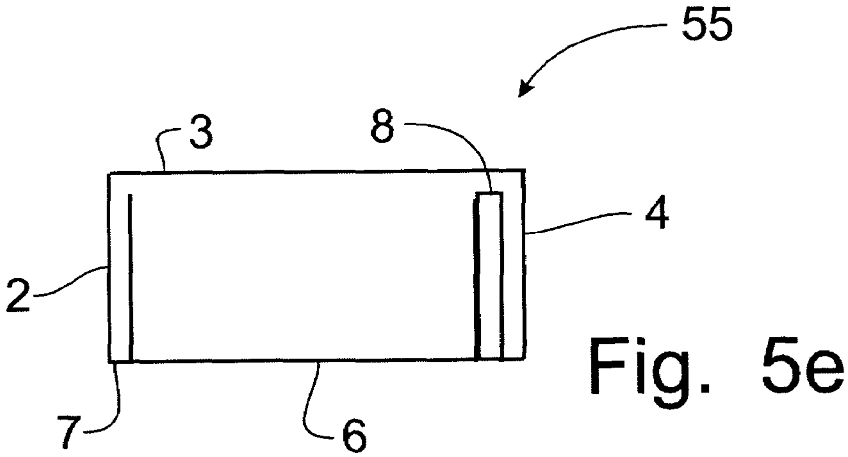
Fig. 5e

Fig. 6a
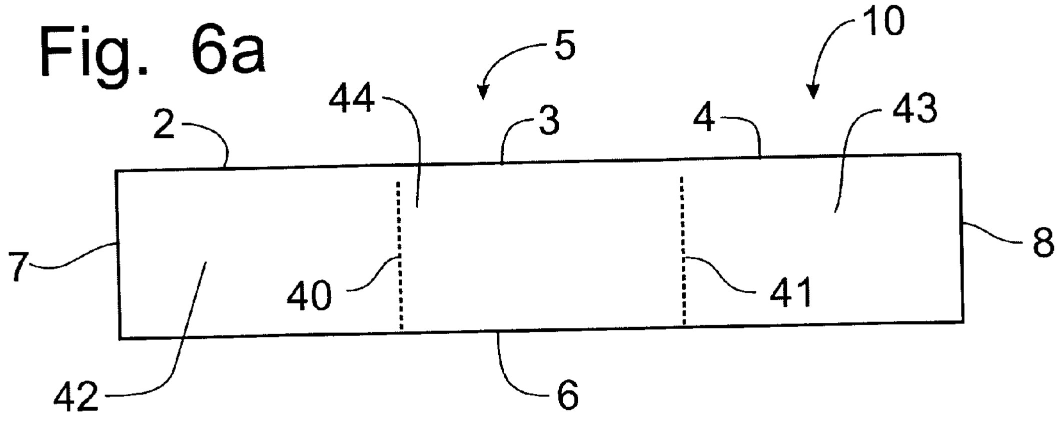
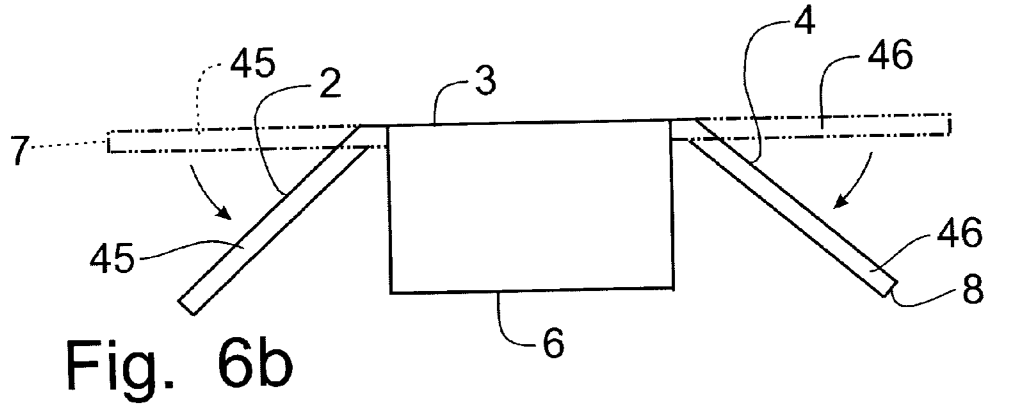
Fig. 6b
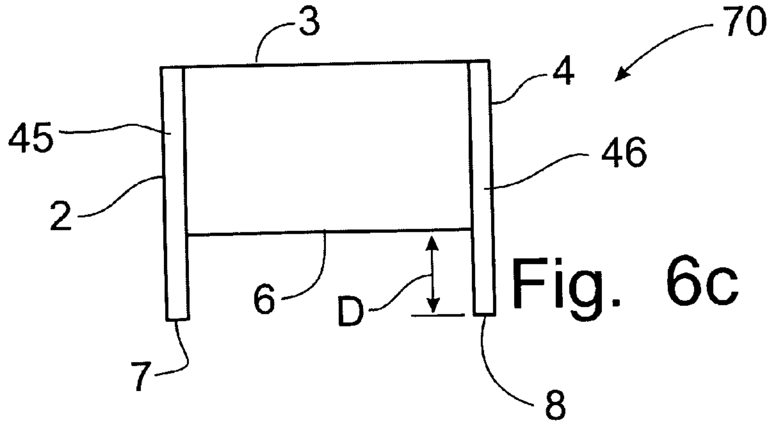
Fig. 6c

Fig. 7a
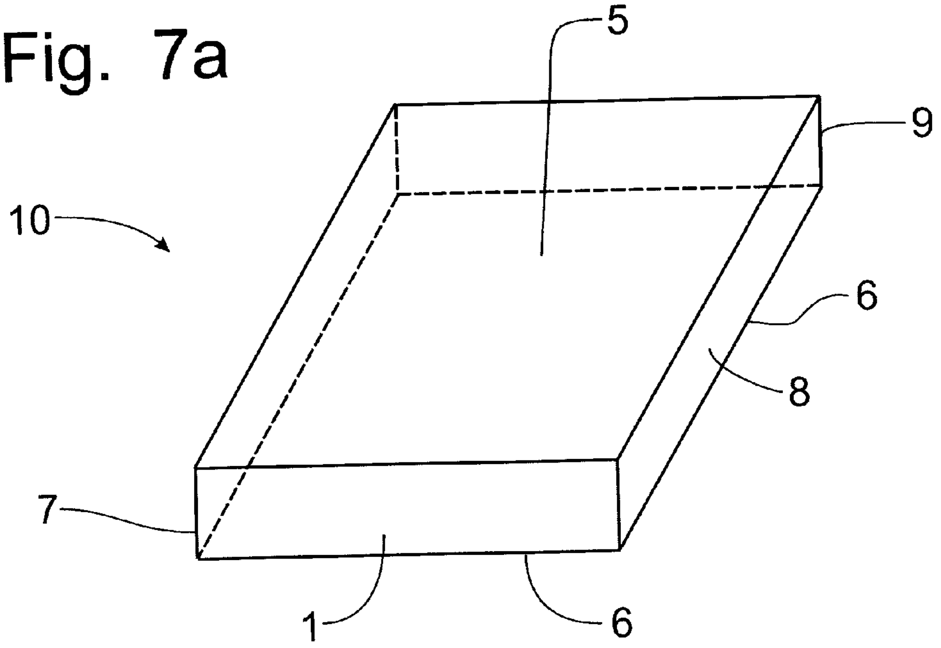
Fig. 7b
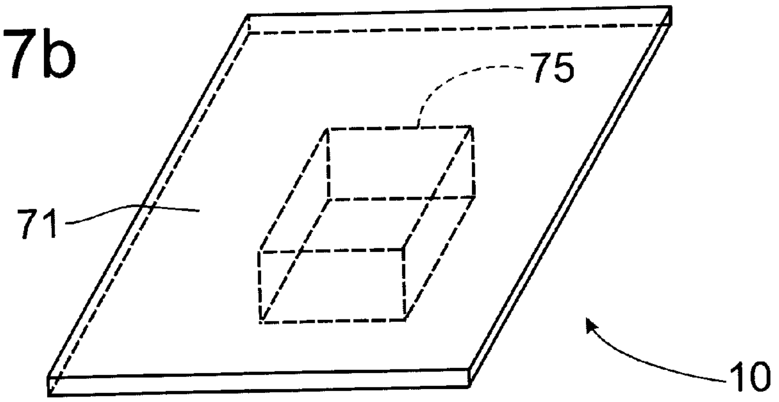
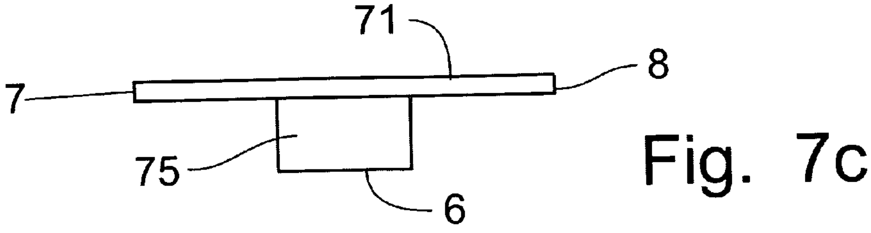
Fig. 7c

METHOD OF FABRICATION OF AN ACOUSTICAL SUBSTRATE INTO A THREE DIMENSIONAL PRODUCT

CROSS REFERENCE TO RELATED APPLICATIONS

This application is a continuation-in-part of U.S. patent application Ser. No. 10/749,087 filed on Dec. 30, 2003, the content of which is incorporated by reference in its entirety.

TECHNICAL FIELD AND INDUSTRIAL APPLICABILITY OF THE INVENTION

The present invention relates generally to acoustic products and more particularly to a method for forming an acoustical product that may be used as an acoustical trap, a duct, a duct liner, or an outer covering for a duct. An acoustical product having reinforced portions is also provided.

BACKGROUND OF THE INVENTION

Acoustical sound insulators, such as acoustic panels, are used in a variety of settings where it is desired to dampen noise from an external source. For example, acoustic panels are commonly used in office buildings to attenuate sound generated from the workplace, such as from telephone conversations or from the operation of office equipment. Acoustic panels are typically formed of a sound absorbing core material positioned within a frame and covered by a material, such as fabric or a painted surface, to make the front side of the panel aesthetically pleasing. In addition, when a frame is not used, the edges of the core material are coated with an adhesive layer and hardened to give strength and rigidity to the acoustic panel. Often, the fabric material is wrapped around the sides of the core material and fastened to the back side of the panel by an adhesive or staples so that the sides of the panel are also aesthetically pleasing. The fabric material may contain a decorative design or pattern.

Although conventional acoustic panels are able to dampen sound over a wide sound/frequency spectrum and may be aesthetically pleasing, they are costly to manufacture and difficult to assemble. To manufacture the acoustic panel, the core material is first fabricated to the finished panel dimensions. The frame must then be properly sized so that the core material fits securely inside. Next, the fabric material is cut to the shape of the finished panel but with sufficient excess so that the fabric material can be wrapped around the edges and secured to the back side of the panel. This excess of fabric material leads to waste and excess cost.

To assemble the acoustic panel, the core material is placed into the frame, the fabric material is wrapped around the panel, and the fabric material is secured to the backside of the panel. In order to ensure that there are no sags in the fabric material, the fabric material must be pulled tightly across and around the panel before securing the fabric material to the panel. In addition, if the fabric contains a design, the fabric must be placed in the proper orientation so that the finished assembly of acoustic panels achieves the desired design. Therefore, the assembly of the acoustic panel can be time consuming and tedious.

Thus, there exists a need in the art for an acoustic panel that contains a decorative surface on both the front of the panel and the sides of the panel that is easy to manufacture, easy to assemble, and is inexpensive.

SUMMARY OF THE INVENTION

An object of the invention is to provide methods for translating a surface on a front side of an acoustical substrate to an edge of a finished acoustical product. In one exemplary method, an acoustical substrate of uncompressed fibrous material having a first density is provided. The acoustical substrate has at least a first surface containing a decorative design, a back surface opposing the first surface, a left edge, and a right edge. The decorative design may be directly applied to the first surface or a decorative veil (e.g., a woven or non-woven fabric) may be applied to the first surface for aesthetic purposes. At least one portion of the acoustical substrate is compressed to form at least one compressed region having a second density that is greater than the first density and at least one groove having a fold point. The compressed region(s) is then rotated about the fold point toward the back surface until the groove is closed. The rotation of the compressed region(s) moves at least a portion of the decorative surface to at least one side of the final acoustical product. Thus, the decorative surface may be translated to any one or all four sides of the final acoustical product. The rotation also places the compressed region at the edge(s) of the final acoustical product, which reinforces the side(s) of the final acoustical product. The final acoustical product may be formed of reinforced edges having any linear or non-linear shape.

In another exemplary method, the acoustical substrate is scored along at least one score line to form at least one outer region and an inner region. The outer region(s) is then compressed to form at least a first flange having a density that is higher than the density of the uncompressed inner region. The flange(s) is then rotated toward the back side of the acoustical substrate until the flange(s) is flush with the inner region. The rotation of the flange(s) moves at least a portion of the decorative surface to at least one side of the final acoustical product. This rotation also places the compressed region(s) at the edge(s) of the final acoustical product, which reinforces the side(s) of the final acoustical product. If the flange(s) extends beyond the back surface, the flange(s) may again be folded toward the back surface until the flange is flush with the back surface. The second rotation of the flange(s) toward the back surface places at least a portion of the decorative design on the back surface of the final acoustical product.

In an alternative embodiment, at least one flange is formed of an inner portion and an outer portion. The outer portion of the flange is then rotated toward the back surface until the outer portion of the flange is flush with the inner portion of the flange. The folded flange is then folded toward the back surface until the folded flange is flush with the inner region, thereby placing the decorative surface on a side of the final acoustical product. In addition, because the folded flange contains two layers of compressed, densified material, the side of the final acoustical product that contains the folded flange is highly reinforced.

Another object of the invention is to provide a decorative non-woven acoustic panel. The acoustic panel includes a main body of uncompressed fibrous material that has a first density and at least one peripheral edge formed of compressed fibrous material having a second density that is greater than the first density. The decorative surface extends across a major surface and at least one side of the acoustic panel. The decorative surface may be integral with the acoustic panel or it may be a separate material, such as a decorative fabric or veil.

The acoustic panel may be formed of a self-molding thermoplastic acoustical material that is lightweight, permeable to air, and capable of being compressed or molded. Fiber systems that are heat moldable or which can be repositioned and held in place by ultrasonics, by an adhesive, or by other commonly used fixation technologies may be used as the acoustical material. In addition, the acoustic panel may be formed of a matrix of staple and heat fusible fibers such as bicomponent fibers. In a preferred embodiment, the acoustic panel is a matrix of polyester staple and copolyester/polyester bicomponent fibers where the sheath component fibers have a lower melting point than the core component fibers and the staple fibers.

The present invention further includes an acoustic panel that has reinforced sides formed of compressed acoustic material having a first density surrounding a central core formed of uncompressed acoustic material having a second density. The reinforced sides of the acoustic panel extend beyond the central core. The acoustic panel may be attached to a frame for mounting to a surface.

A further object of the present invention is to provide an acoustical product that may be used as an acoustical trap or as a duct, duct liner, or an outer covering for a duct. The acoustical product may be in the form of a box-like or other parallelepipedic structure or other structure having a polygon cross-sectional configuration. An acoustical substrate of an uncompressed fibrous material having a first surface optionally containing a design, a back surface opposing the first surface, a left edge, and a right edge is provided. In addition, the first surface is formed of a left first surface, a central first surface, and a right first surface. The length of the left first surface is approximately equal to the length of the central first surface plus the right first surface. In at least one exemplary embodiment, the acoustical product is scored to delineate compression regions that are subsequently compressed to form a flange, a first compressed region, a second compressed region, and a third compressed region. First, second, third, and central uncompressed regions are positioned adjacent to the compressed regions. The left first surface and the right first surface of the acoustical substrate are folded toward the back surface until the second compressed region and the third compressed region are folded against the central region. The outer portion of the left first surface (e.g., the region of the left first surface that extends beyond the right first surface) is then folded or rotated towards the back surface until the flange is flush with the right edge, thereby forming a box-like acoustical product. Portions of the compressed regions may be beveled or notched to facilitate the bending or rotation of the left first surface, the right first surface, and the outer portion of the left first surface. By folding the acoustical substrate in such a manner, the decorative design originally located on the first surface is now positioned on all sides of the acoustical product.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

FIGS. 1*a*-1*d* are schematic illustrations depicting a method of translating a decorative surface to the edges of a final acoustical product according to one exemplary embodiment of the present invention;

FIGS. 2*a*-2*e* are schematic illustrations depicting an alternative location for the grooves formed by the method depicted in FIGS. 1*a*-1*d;*

FIGS. 3*a*-3*d* are schematic illustrations depicting a second method for translating a decorative surface to the edges of final acoustical product according to one exemplary embodiment of the present invention;

FIGS. 4*a*-4*b* are schematic illustrations depicting an alternative embodiment of the method of FIGS. 3*a*-3*d* in which notches are cut into the first and second flanges;

FIGS. 5*a*-5*e* are schematic illustrations depicting an alternate embodiment of the method of FIGS. 3*a*-3*d* in which the second flange is folded twice to provide a highly reinforced edge;

FIGS. 6*a*-6*c* are schematic illustrations depicting an alternate embodiment of the method of FIGS. 3*a*-3*d* in which the first and second flanges extend beyond the back surface of the final acoustical product;

FIGS. 7*a*-7*f* are schematic illustrations depicting an alternate embodiment of the method of FIGS. 6*a*-6*c* in which four flanges are formed and folded to form a box-like final acoustical product;

DETAILED DESCRIPTION AND PREFERRED EMBODIMENTS OF THE INVENTION

Figure 2A:
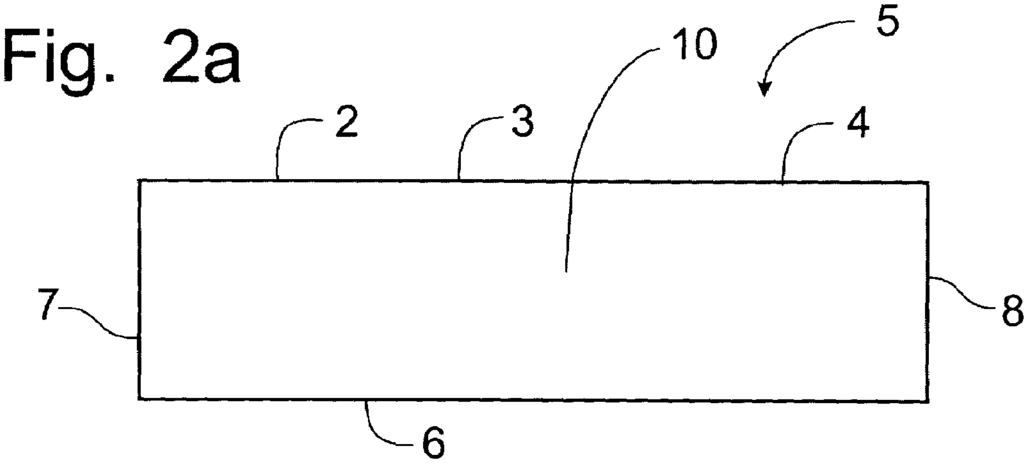

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. It is to be noted that like numbers found throughout the figures denote like elements.

The present invention relates to methods for translating a decorative surface on a front side of an acoustical substrate to an edge of the finished acoustical product. One exemplary inventive method is illustrated in FIGS. 1*a*-1*d*. As shown in FIG. 1*a*, an acoustical substrate 10 is provided which has a first surface 5, a back surface 6 opposing the first surface 5, a left edge 7, and a right edge 8. The first surface 5 includes a left first surface 2, a central first surface 3, and a right first surface 4. The acoustical substrate 10 contains a decorative design (not shown) on the first surface 5 for aesthetic purposes. The decorative design may be directly applied to the first surface 5. Alternatively, a decorative veil (not shown) may be positioned on the first surface 5 to provide a design. As used herein, the term "veil" is meant to include both woven and non-woven fabrics. Although a decorative design may be located on the first surface 5, a decorative design or decorative veil may also optionally be located on the back surface 6.

The material used to form the acoustical substrate 10 may be a self-molding thermoplastic acoustical material that is lightweight, permeable to air and capable of being compressed or molded, such as by a conventional compression or molding press. For example, the acoustical substrate 10 may be a matrix of polymer fibers, such as, but not limited to, polyethylene fibers, polypropylene fibers, polyester fibers, such as polyethylene terephthalate (PET) fibers, polyamide fibers, polyphenylene sulfide (PPS) fibers, polystyrene fibers, polycarbonate fibers, natural fibers (e.g., cotton and cellulose), inorganic fibers (e.g., glass fibers), or mixtures thereof. Preferably, the polymer fibers are a blend polyethylene terephthalate (PET). Other fiber systems that are heat moldable or which can be repositioned and held in place by ultrasonics, by an adhesive, or by other commonly used fixation technologies easily identifiable by one of skill in the art are considered to be within the purview of this invention. In addition, the acoustical substrate 10 may have a thickness of from approximately 0.1 inch-4.0 inches and a density of from approximately 1 lb/ft$^3$-10 lb/ft$^3$. In the inventive methods discussed below, the compressed regions preferably have a density of from approximately 7 lbs/ft$^3$-30/ft$^3$. In each of the inventive embodiments described below, the compressed regions have a density that is greater than the non-compressed regions.

In a preferred embodiment, the acoustical substrate 10 is formed of a matrix of staple and heat fusible fibers such as bicomponent fibers. Bicomponent fibers may be formed of two polymers combined to form fibers having a core of one polymer and a surrounding sheath of the other polymer. When bicomponent fibers are used as a component of the acoustic material, the bicomponent fibers may be present in an amount of from 10-100% of the total fibers. In the instant invention, the acoustical substrate is preferably a matrix of polyester staple and copolyester/polyester bicomponent fibers where the sheath component fibers have a lower melting point than the core component fibers and the staple fibers.

To translate the decorative design located on the first surface 5 to an edge of the finished acoustical product, at least one region of the acoustical substrate 10 may be compressed in a manner such that at least a portion of the first surface 5 can be folded toward the back surface 6 to place the decorative design located on the first surface 5 on the edge of the finished product. In the embodiment depicted in FIG. 1*b*, portions of the back surface 6 of the acoustical substrate 10 are compressed, such as by a heat "V" groove molding wheel, to form a first groove 20 and a second groove 21. As depicted in FIG. 1*c*, the left portion 24 formed by first groove 20 contains the left first surface 2, the left edge 7, and a first inner surface 12. The right portion 25 contains the right first surface, the right edge 8, and a second inner surface 13. The left and right portions 24, 25 of the acoustical substrate 10 may then folded or rotated about first and second fold points 14 and 15 respectively, as shown from the phantom lines in FIG. 1*c*, to collapse first and second grooves 21, 22. FIG. 1*d* illustrates the final acoustical product 30 formed once the left portion 24 and the right portion 25 have been rotated and first and second grooves 20, 21 have been completely collapsed.

As shown in FIG. 1*d*, in the final acoustical product 30, the decorative design located on the left first surface 2 of the acoustical substrate 10 has been transferred to the left side of the final acoustical product 30 and the decorative design located on the right first surface 4 has been transferred to the right side of the final acoustical product 30. In addition, the left edge 7 and the right edge 8 are now positioned on the back side of the final acoustical product 30 contiguous with the back surface 6.

The left and right portions 24, 25 may be held in this rotated or folded position, and thus the shape of the final acoustical product 30 maintained, through heat molding. For example, when bicomponent fibers having a core component and a sheath component with a melting point less than the melting point of the core component are used in the acoustical substrate 10, the final acoustical product 30 may be heated to a temperature sufficient to soften the sheath but not the core of the fibers. The softened sheath acts as a binder between adjacent fibers that cause the fibers to bond together in the shape of the final acoustical product 30. The final acoustical product 30 is then cooled to set the shape. In an alternate embodiment, ultrasonics may be used to provide the bonding energy required to bond the bicomponent fibers located at the sheath interface together. Alternatively, an adhesive material can be used to hold the left and right portions 24, 25 in their rotated position and maintain the shape of the final acoustical product 30. Other conventional bonding methods may be used to hold the left and right portions 24, 25 in their folded positions, and would be identifiable by one of ordinary skill in the art. Due to the compression of the fibers in the acoustical substrate 10, portions of the acoustical substrate 10 adjacent to grooves 20, 21 have an increased density. Thus, once the left portion 24 and the right portion 25 are rotated or folded as shown in FIG. 1*d*, the edges or sides of the final acoustical product 30 are reinforced and have an increased strength and a density that is greater than the density of the inner portion of the final acoustical product 30.

Figure 2B:
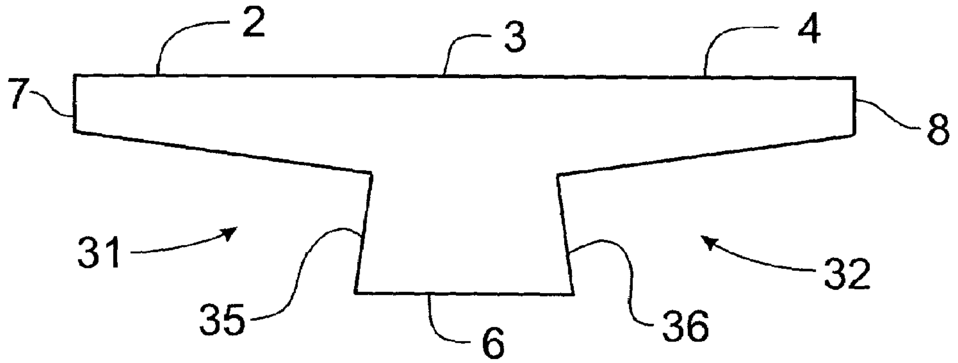

Various other locations for compressing the acoustical substrate 10 and forming a groove or multiple grooves in the acoustical substrate 10 such that collapsing the groove(s) would place the decorative surface on at least a portion of a side of the final acoustical product would be easily identified by one of skill in the art, and are considered to be within the purview of this invention. For example, in an alternate embodiment shown in FIGS. 2*a*-2*d*, a first groove 31 having a first side 35 is formed on the left edge 7 of the acoustical substrate 10 and a second groove 32 having a second side 36 is formed on the right edge 8 of the acoustical substrate 10 by compression (FIG. 2*b*). The left portion 33 and the right portion 34 of the acoustical substrate 10 are folded toward the back surface 6, as shown from the phantom lines in FIG. 2*c*, until the first groove 31 and the second groove 32 are collapsed. The intermediate product (not shown) resulting from this rotation of the left and right portions 33, 34, has a non-rectangular shape. To form substantially 90° corners as illustrated in the final acoustical product 37 shown in FIG. 2*d*, an external forming device may be used to compress the fibers in the area of the left first surface 2 and the right first surface 4 and mold the intermediate product (not shown) to form substantially 90° corners. Alternative shapes, such as, but not limited to, rounded corners (illustrated in FIG. 2*e*), may be formed by such an external forming device or mold by compressing the intermediate product into the desired shape.

Once the first and second grooves 31, 32 are completely collapsed, the decorative design that was positioned on the left first surface 2 on the first surface 5 of the acoustical substrate 10 is now positioned on the left side of the final acoustical product 37 and the decorative design that was positioned on the right first surface 4 on the first surface 5 of the acoustical substrate 10 is now positioned on the right side of the final acoustical product 37. It is to be noted that in this embodiment, the compressed regions (e.g., the areas surrounding first and second sides 35, 36) are not located at the edges of the final acoustical product 37. Instead, the compressed regions are positioned along the back surface 6 of the final acoustical product 37. These compressed regions have a density that is greater than the density of the uncompressed regions, which results in greater strength and/or stiffness of the final acoustical product 37.

The decorative design on the acoustical substrate 10 may be applied in a planar fashion to the first surface 5 of the acoustical substrate 10, and may include colors, geometric or abstract designs or shapes, or other patterns or images. It is to be understood that the decorative design or the decorative veil may be added prior to or after the compression and densification of the acoustical substrate. In addition, the decorative design can be embossed, such as in a texturizing mold, to give a textured feel to the acoustical substrate 10. If the decorative design is embossed prior to the application of the decorative design or after the application of the design to the acoustical substrate 10 but before translating the decorative design to the edge of the final acoustical product, the texturing can be accomplished on a single plane with a single texturing roll or other similar texturing device known to those of skill in the art. Moreover, when the texturing is accomplished on a single plane, the image or design can be aligned with the texture so that the changes in shape match with the image changes. On the other hand, if the decorative design is embossed after the design has been translated to the edges of the finished acoustical product, each surface containing the design may be individually embossed.

Turning now to FIGS. 3*a*-3*d*, a second inventive method for translating a decorative surface of an acoustical substrate to an edge of the finished acoustical product can be seen. As in the embodiments discussed above, the acoustical substrate 10 includes a first surface 5 having a decorative design to make the acoustical substrate 10 aesthetically pleasing, a back surface 6 opposing the first surface 5, a left edge 7, and a right edge 8. In addition, the first surface 5 is formed of a left first surface 2, a central first surface 3, and a right first surface 4.

Initially, the acoustical substrate 10 is scored along first and second score lines 40, 41 respectively to delineate a left outer region 42, a right outer region 43, and a central region 44 as is shown in FIG. 3*a*. Preferably, the acoustical substrate 10 is scored to a depth sufficient to score to the decorative design or decorative veil located on the first surface 5. However, it is possible to score a portion of the decorative design or decorative veil as long as a sufficient number of fibers remain to provide a strong fold point. By scoring the acoustical substrate 10 to a depth sufficient to reach the decorative design on the first surface 5, the radius of curvature of the folded edge may be reduced, thereby yielding a sharper edge detail in the final acoustical product. A slitter blade or other similar blade or cutting technique known by those of skill in the art to score or sever a material can be used to score the acoustical substrate 10. Preferably, the blade is less than or equal to 1/16 of an inch in thickness.

The length of the left outer region 42 (e.g., the distance extending from left edge 7 to the first score line 40) and the length of the right outer region 43 (e.g., the distance extending from the right edge 8 to the second score line 41) may be equal to or greater than the width of the central region 44 (e.g., the distance from the first surface 5 to the back surface 6) to place the decorative design on the entire side of the final acoustical product 50. However, if only a portion of the side of the final acoustical product 50 is to contain the decorative design, then the length of the left outer region 42 and the right outer region 43 may be shorter than the width of the central region 44.

As illustrated in FIG. 3*b*, the left outer region 42 and the right outer region 43 are then compressed, e.g., under heat, to form a first flange 45 and a second flange 46. Preferably, the left and right outer regions 42, 43 are compressed to a thickness of approximately 1/32 of an inch to approximately 1/2 of an inch. Once the compression of the left outer region 42 and the right outer region 43 is complete, a heated and/or shaped tip may optionally be used to melt a portion of the fibers in the area where the first flange 45 and second flange 46 intersects with the central region 44 (not shown) to make room for the first and second flanges 45, 46 once they are folded as described below. Additionally, the fibers in the central region 44 may be softened to provide a bonding region for the first and second flanges 45, 46 after they are folded. Alternatively, an adhesive may be applied to the central region 44 to bond the folded flanges to the central region 44.

Alternatively, portions of the first and second flanges 45, 46 may be removed or compressed to provide fold points about which the first and second flanges 45, 46 can rotate or fold. Such an alternative embodiment is illustrated in FIG. 4*a*, which depicts a first notch 48 formed in the first flange 45 and second and third notches 49, 49*a* formed in the second flange 46. The first, second, and third notches 48, 49, 49*a* may be formed by removing material from the first and second flanges 45, 46, such as by with a conventional blade or saw, heat melting the fibers in the first and second flanges 45, 46, or by compressing the portions of the first and second flanges 45, 46 at the desired fold points. The first notch 48, the second notch 49, and the third notch 49*a* provide first, second, and third fold points 51, 52, 52*a* respectively (shown in FIG. 4*a*) for the rotation of the first and second flanges 45, 46 toward the back surface 6 (shown in FIG. 4*b*). The first flange 45 may be rotated about the first fold point 51 and the second flange 46 may be rotated about the second and third fold points 52, 52*a* as shown in FIG. 4*b*.

Turning back to FIGS. 3*a*-3*d*, the first and second flanges 45, 46 are then folded toward the back surface 6 (shown from the phantom lines depicted in FIG. 3*b*) until the first flange 45 and the second flange 46 are flush with the central region 44 (not shown). Once the second flange 46 is flush with the central region 44, the second flange 46 may again be folded toward the back surface 6, as shown from the phantom lines in FIG. 3*c*, to form the final acoustical product 50 (FIG. 3*d*). The folded first and second flanges 45, 46 may be bonded to the central region 44 by softening the sheath fibers through conventional bonding means such as heat transfer, hot air, or ultrasonics. Alternatively, the first and second flanges 45, 46 may be affixed to the central region 44 by any conventional adhesive. A heated tip or other heating device may optionally be used to shape the folded flanges to provide a crisp edge to the final acoustical product 50.

As illustrated in FIG. 3*d*, the decorative design located on the left first surface 2 is now positioned on the left side of the final acoustical product 50 and the design on the right first surface 4 is now positioned on the right side. In addition, at least a portion of the decorative design located on the right first surface 4 is now positioned on the back side of the final acoustical product 50. Additionally, because the first and second flanges 45, 46 contain compressed fibers, the first and second flanges 45, 46 have an increased stiffness and/or superior strength. As a result, folding the first and second flanges 45, 46 as shown in FIGS. 3*c* and 3*d*, the left and right sides and corners of the final acoustical product 50 are reinforced.

In an alternate embodiment illustrated in FIGS. 5*a*-5*d*, the acoustical substrate 10 is scored along the first score line 40 and the second score line 41. As in the embodiment described above with respect to FIGS. 3*a*-3*d*, the left outer region 42 is compressed to form the first flange 45 and the right outer region 43 is compressed to form the second flange 46 (shown in FIG. 5*b*). An outer portion 46*a* of the second flange 46 is then folded as shown in FIG. 5*c* until the outer portion 46*a* is flush with an inner portion 46*b* and the right edge 8 is facing the central region 44 (e.g., the outer portion 46*a* is rotated approximately 180°). The second flange 46 may have a portion of the fibrous material removed at the intersection of the outer portion 46*a* and the inner portion 46*b* so that the outer portion 46*a* can be rotated or folded approximately 180° and be flush with the inner portion 46*b*. Alternatively, heat may be applied such as through a heated tip to soften the fibers at the intersection and facilitate bending the second flange 46 so that the flange can subsequently be molded to form a crisp corner.

The folded flange 53 is then folded (rotated) toward the back surface 6 (FIG. 5*d*) until the folded flange 53 is flush with the central region 44 (FIG. 5*e*). As with the embodiment described above in FIGS. 3*a*-3*d*, the compressed fibrous material (e.g., densified fibrous material) in the first and second flanges 45, 46 strengthens the edges and corners of the final acoustical product 55. Thus, when the first and second flanges 45, 46 are folded as shown in FIGS. 5*d*-*e*, the left side of the final acoustical product 55 is reinforced and the right side of the acoustical product is highly reinforced due to presence of the two layers of compressed (densified) fibrous material on the right side. Additionally, the decorative design on the first surface 5 is transferred to the sides of the final acoustical product 55. By notching the underside of the second flange 46, at least a portion of the decorative design may be transferred to the back side of the final acoustical product 55.

In a further alternative embodiment of the method described in FIGS. 3*a*-3*d*, the acoustical substrate 10 is scored with a tool, such as an abrasion wheel or other similar type cutting mechanism identifiable to those of skill in the art, that is at least 1/16 of an inch in thickness. Such a tool will remove fibers from the acoustical substrate 10 along the length of the score. This method permits the first flange 45 and the second flange 46 to fold or nest into the areas removed in the central region 44 by the abrasion wheel (e.g., nesting areas).

Unlike the embodiment described above in which the backside of the decorative design may be scored to ensure a crisp folding of the first and second flanges 45, 46, this inventive embodiment uses the thicknesses of the first and second flanges 45, 46 and the nesting areas to force the location of the fold point. However, it is to be understood that the abrasion wheel may also be used to score a fold point in the first and second flanges 45, 46. In addition, the abrasion wheel may be used to remove some of the fibrous material on the left outer region 42 (e.g., fibrous material located at the left edge 7 and at the region of the intersection of the left outer region 42 and the central region 44) and some of the fibrous material located on the right outer region 43 (e.g., fibrous material located at the right edge 8 and at the intersection of the right outer region 43 and the central region 44) to compensate for the lateral expansion of the fibrous material when the left outer portion 42 and the right outer portion 43 are compressed to form the first and second flanges 45, 46.

It is sometimes desirable to form an acoustical product that does not have a decorated surface that ends flush with the back of the acoustical substrate or the acoustical panel. Acoustic panels of varying thicknesses ranging from approximately 0.25 inches to approximately 4.0 inches may be needed to meet the acoustical requirements, wall or ceiling thickness requirements, or both. In this regard, FIGS. 6*a*-6*c* illustrate an inventive method whereby an acoustical product is formed that has varying thicknesses.

Turning to FIG. 6*a*, an acoustical substrate 10 that includes a first surface 5 having a decorative design thereon to make the acoustical substrate 10 aesthetically pleasing, a back surface 6 opposing the first surface 5, a left edge 7, and a right edge 8 is provided. In addition, the first surface 5 is formed of a left first surface 2, a central first surface 3, and a right first surface 4. The acoustical substrate 10 is scored along the first score line 40 and the second score line 41 to form the left outer region 42, the right outer region 43, and the central region 44. In this embodiment, the length of both the left outer region 42 (e.g. the distance from the left edge 7 to the first score line 40) and the right outer region 43 (e.g., the distance from the right edge 8 to the second score line 41) is greater than the width of the acoustical substrate 10 (e.g., the distance from the first surface 5 to the back surface 6). The length of the left outer region 42 is preferably equal to the right outer region 43.

The left outer region 42 and the right outer region 43 are then compressed, such as by heating the acoustical substrate 10 and concurrently applying pressure, to form the first flange 45 and the second flange 46 respectively. Next, the first flange 45 and the second flange 46 are folded or rotated toward the back surface 6 (shown in FIG. 6*b*) until they are flush with the central region 44 (shown in FIG. 6*c*). Because the length of the first and second flanges 45, 46 is greater than the width of the acoustical substrate 10, the sides of the final acoustical product 70 extend below the back surface 6. The distance (D) that the first and second flanges 45, 46 extend beyond the back surface 6 of the acoustical substrate 10 represents the distance that the final acoustical product 70 will be spaced out from the surface upon which the acoustical panel is mounted. As can be seen in FIG. 6*c*, the decorative surface on the left first surface 2, which was originally on the top surface of the acoustical substrate 10, has been transferred to the left side of the final acoustical product 70 and the decorative surface on the right first surface 4, which was originally on the top surface of the acoustical substrate 10, has been transferred to the right side of the final acoustical product 70.

The final acoustical product 70 shown in FIG. 6*c* may also be used to form a tuned acoustical absorber. In this exemplary embodiment (not shown), the central region 44 is compressed to form a rigid pan. The central region 44 may be compressed evenly across its length or it may be compressed to varying thicknesses. Absorbing material may then be added and adhered to the pan, such as by an adhesive material, prior to mounting the tuned absorber onto a surface. Suitable examples of the absorbing material include, but are not limited to, polymer fibers, glass fibers, and open cell foam plastics. The type and amount of absorbing material that is added to the pan is dependent upon the desired acoustical properties of the tuned acoustical absorber. However, it is preferable that the amount of absorbing material that is added to the pan results in a thickness that is less than or equal to the depth of the compression in the pan.

Although the methods depicted in FIGS. 1*a*-6*c* are described with respect to two regions of the acoustical substrate being compressed and folded to move the decorative surface to the left and right sides of the final acoustical product, the acoustical substrate may be compressed in only one region to place the decorative surface and the compressed region on one side of the final acoustical product. Additionally, the acoustical substrate may be compressed in more than two regions (e.g., three or more) to place the decorative surface and compressed regions on multiple sides of the final acoustical product. The placement of the compressed regions translates the decorative design to a desired side of the final acoustical product. Thus, according to the principles of the instant invention, the decorative surface can be translated to any one or to all of the sides of the final acoustical product. Similarly, the compressed regions may be positioned on any one side or all of the sides of the final acoustical product to reinforce and strengthen the final acoustical product. Further, the final acoustical product may be formed of reinforced edges having any linear or non-linear shape. In addition, the length of the compressed regions relative to the width of the acoustical substrate and how the compressed regions are folded (e.g., double folded, folded over to the back side of the acoustical substrate, etc.) to form the final acoustical product are chosen depending on the desired shape and application of the final acoustical product.

Figure 7D:
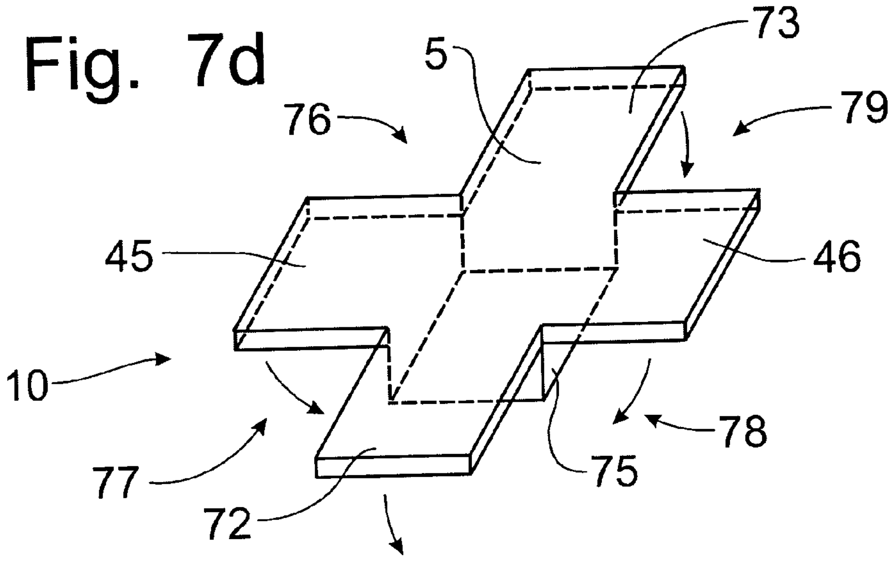

One such example of translating the decorative surface to all of the sides of the final acoustical product is illustrated in FIGS. 7*a*-7*f*. As shown in FIG. 7*a*, the acoustical substrate 10 contains the first surface 5, the bottom surface 6 opposing the first surface 5, the right edge 8, the left edge 7, a front edge 1, and a rear edge 9 opposing the front edge 1. Perimeter regions of the acoustical substrate 10 are compressed to form a region of compressed material 71 (FIG. 2*b*) having a first density. A core of uncompressed material 75 (shown in phantom in FIG. 7*b*) having a second density that is less than the first density is positioned substantially at the center of the acoustical substrate 10 and extends below the compressed region 71. The orientation of the core 75 below compressed region 71 can best be seen in FIG. 7*c*, which shows the acoustical substrate of FIG. 7*b* in elevation.

Figure 7E:
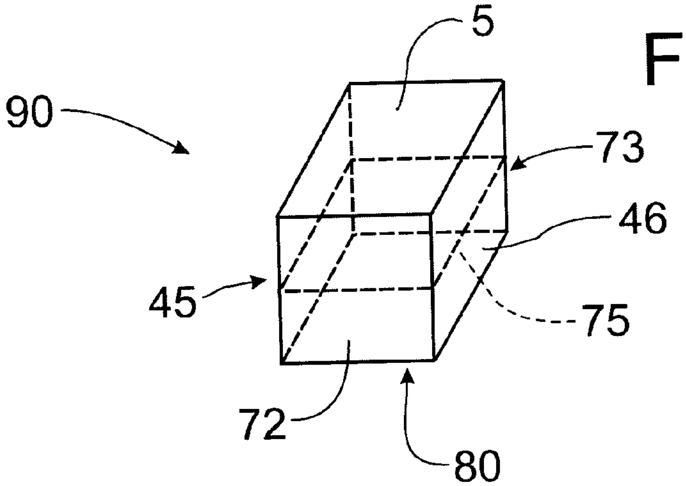
Figure 7F:
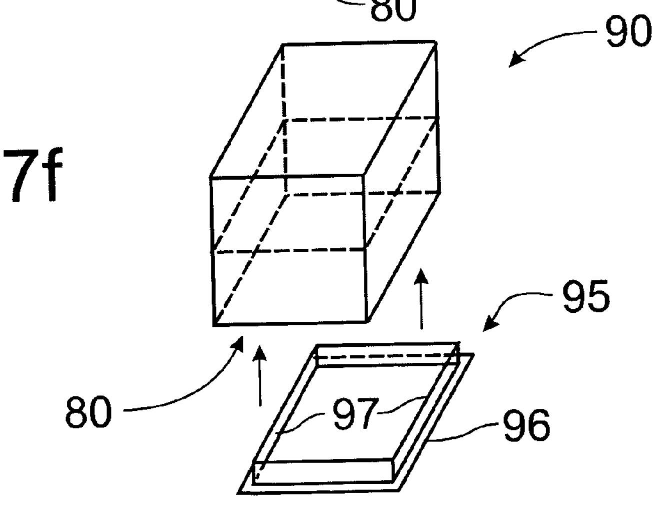

Portions 76, 77, 78, 79 of the compressed material 71 positioned around the perimeter are then removed to form the first flange 45, the second flange 46, a front flange 72, and a rear flange 73, as illustrated in FIG. 7*d*. The first, second, front, and rear flanges 45, 46, 72, 73 are folded toward the back surface 6 as depicted in FIG. 7*d* until the flanges 45, 46, 72, 73 are flush with the core 75, forming a box-like final acoustical product 90 (FIG. 7*e*). Optionally, the edges of the flanges 45, 46, 72, 73 may be beveled so that when the flanges 45, 46, 72, 73 are folded and flush with the core 75, they come together to form a clean corner. As shown in FIG. 7*e*, the first, second, front, and rear flanges 45, 46, 72, 73 extend beyond the core 75 when they are completely folded and form a void 80 that is open at the bottom and surrounded by the core 75 and the first, second, front, and rear flanges 45, 46, 72, 73.

The final acoustical product 90 may optionally be attached to a frame 95 having a base 96 and flanges 97 for mounting the final acoustical product 90 to a surface, such as a wall. The frame 95 may be positioned such that the flanges 97 are placed into the void 80. The flanges 97 are then affixed to the first, second, front, and rear flanges 45, 46, 72, 73, and/or the back surface 6 such as by an adhesive or mechanical fastener. The frame 95 may then be mounted on a surface by affixing the base 96 to the surface. The frame 95 may also have an extended region (not shown) for attaching hardware or securing the frame to a larger structure. If the extended region is present on the frame 95, a notch (not shown) is then cut into one or more of the first, second, front, and rear flanges 45, 46, 72, 73 to accommodate the extended region. It is to be understood that the frame 95 is depicted for illustrative purposes and that any suitable frame may be used so long as the frame 95 is attached to at least one of the first, second, front, or rear flanges 45, 46, 72, 73 or to the back surface 6.

In an alternate embodiment (not shown), two acoustical products may be attached to a frame. In such an embodiment, a first acoustical product may be placed over the frame at a first half so that one half of the frame is covered by the first acoustical product. A second acoustical product may then be placed over the second half of the frame such that the two acoustical product abut each other. The acoustical products may be attached to the frame by an adhesive or by mechanical fasteners. This embodiment forms a two-sided final acoustical substrate.

FIGS. 8*a*-8*g* illustrate an example of translating the decorative surface to all of the sides of the final acoustical product using multiple score lines and multiple compressed regions to place the decorative surface and compressed regions on multiple sides of the final acoustical product. As with the embodiments discussed above, the acoustical substrate 10 includes a first surface 5 having a decorative design (not shown) to make the acoustical substrate 10 aesthetically pleasing, a back surface 6 opposing the first surface 5, a left edge 7, and a right edge 8. In addition, the first surface 5 is formed of a left first surface 2, a central first surface 3, and a right first surface 4.

Figure 8A:
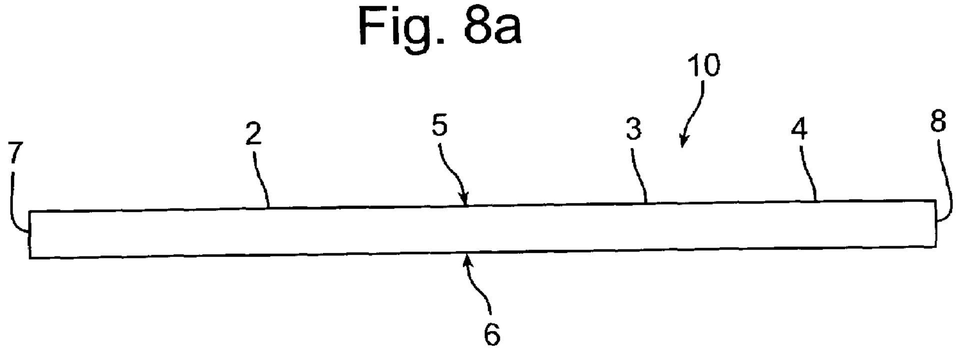
FIGS. 8*a*-8*g* are schematic illustrations depicting a method of forming an acoustical box-like product according to one exemplary embodiment of the invention.
Figure 8B:
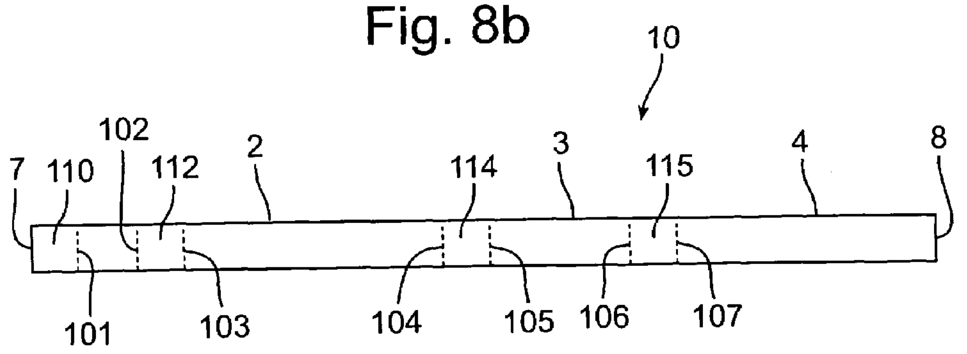

Initially, the acoustical substrate 10 is scored along score lines 101, 102, 103, 104, 105, 106, and 107 to delineate a first compression region 110, a second compression region 112, a third compression region 114, and a fourth compression 116, as is shown in FIG. 8*b*. The length of the left first surface 2 (e.g., the distance extending from left edge 7 to score line 105) is substantially equal to the length of the central first surface 3 (e.g., the distance extending from score line 105 to score line 106) plus the length of the right first surface 4 (e.g., the distance from score line 106 to the right edge 8) to place the decorative design on all sides of the final acoustical product. A slitter blade or other similar blade or cutting technique known by those of skill in the art to score or sever a material can be used to score the acoustical substrate 10. The acoustical substrate 10 may be scored to a depth sufficient to score to the decorative design or decorative veil located on the first surface 5 or to score a portion of the decorative design. If the decorative design or veil is scored, it is preferred that a sufficient number of fibers remain to provide a strong fold point.

Figure 8C:
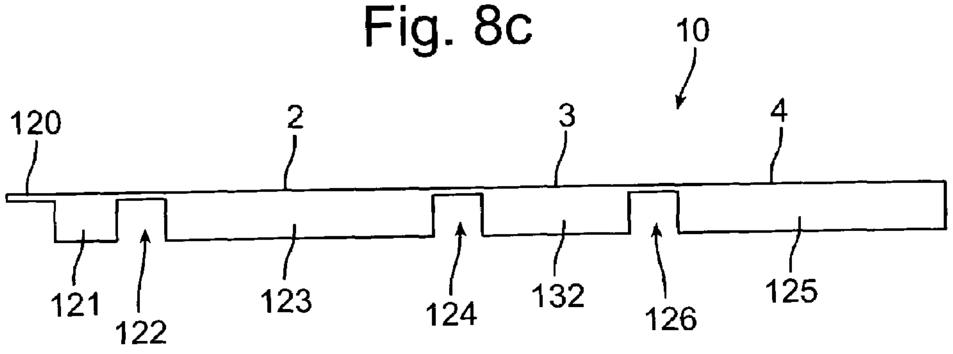
Figure 8D:
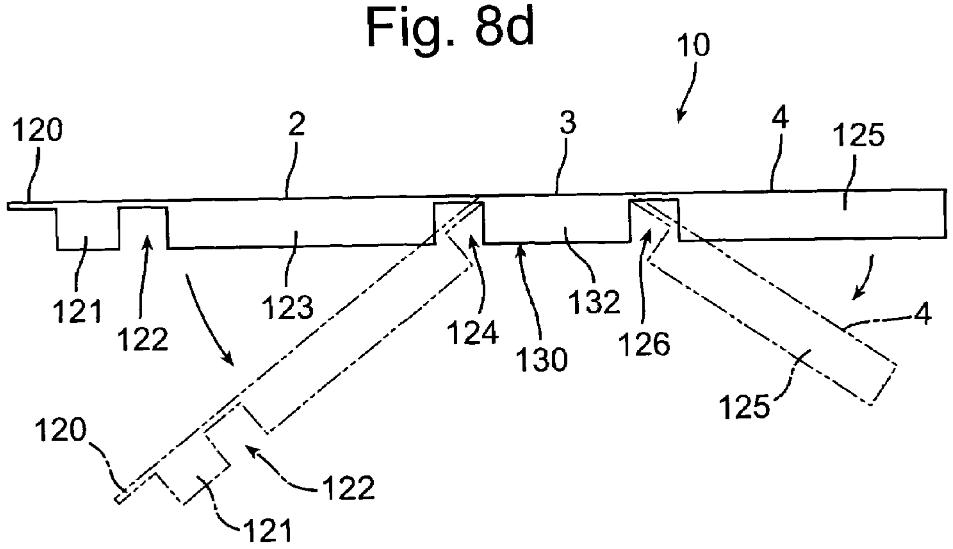

The first, second, third, and fourth compression regions 110, 112, 114, and 116 are compressed, such as by heat, to form a flange 120, a first compressed region 122, a second compressed region 124, and a third compressed region 126 respectively as illustrated in FIG. 8*c*. Uncompressed regions 121, 123, 132, and 125 are positioned respectively adjacent the compressed regions 120, 122, 124, and 126. In preferred embodiments, the flange 120 and the first, second, and third compressed regions 122, 124, and 126 are compressed to a thickness of approximately 1/32 of an inch to approximately ½ of an inch. The left first surface 2 and the right first surface 4 are then folded toward the portion 130 of the back surface 6 opposite the central first surface 3 (shown from phantom lines depicted in FIG. 8*d*) until the second compressed region 124 and the third compressed region 126 are folded against the central region 132.

A heated and/or shaped tip may be used to melt a portion of the fibers in the central region 132 where the second compressed region 124 intersects with the central region 132 and/or where the third compressed region 125 intersects with the central region 132 (not shown) so that the second and third compressed regions 124, 126 may be folded against the central region 132. Alternatively, heat may be applied to soften the fibers at the intersection of the second compressed region 124 and the third compressed region 126 with the central region 132 to facilitate bending the left first surface 2 and the right first surface 4.

Figure 8G:
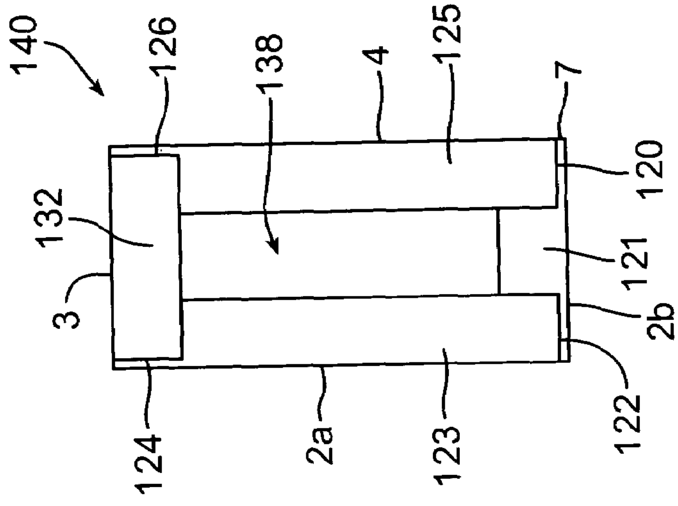
Figure 8F:
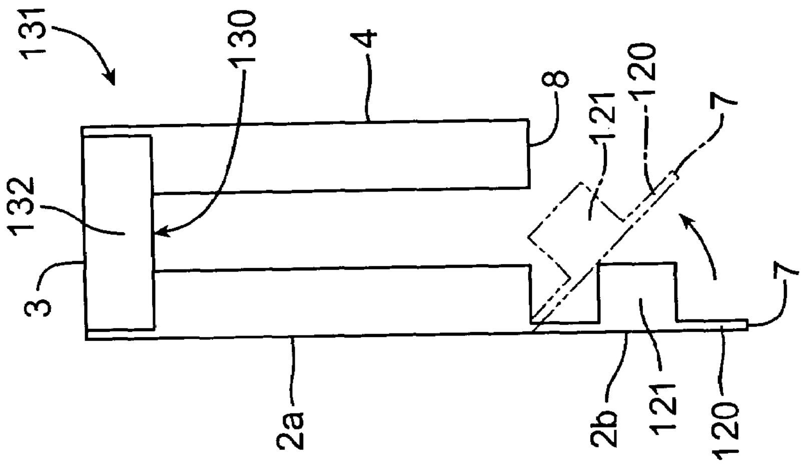
Figure 8E:
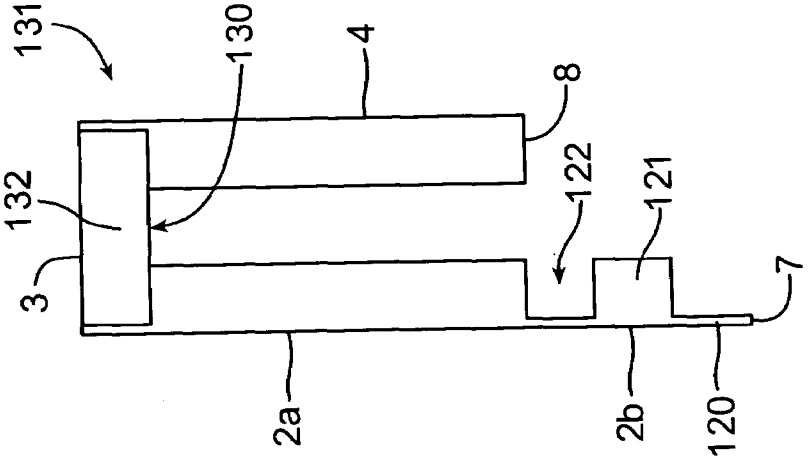

To retain the left first surface 2 and the right first surface 4 in a folded configuration (i.e., intermediate product 131) as depicted in FIG. 8*e*, fibers in the central region 132 may be softened, such as, for example, by heat transfer, hot air, or ultrasonics, to provide a bonding region for the second compressed region 124 and the third compressed region 126 after they are folded. For example, when bicomponent fibers are used in the acoustical substrate 10, the central region 132 may be heated to a temperature sufficient to soften the sheath but not the core of the fibers, thereby causing the fibers to bond together. The intermediate product 131 is then cooled to set the shape. Alternatively, an adhesive may be applied to the central region 132 to bond the second and third compressed regions 124, 126 to the central region 132. Other conventional bonding methods may be used to hold the left first surface 2 and the right first surface 4 in their folded positions, and would be identifiable by one of ordinary skill in the art.

Because the left first surface 2 is greater in length than the right first surface 4, the left first surface 2 extends beyond the right first surface 4 in the partially folded configuration illustrated in FIG. 8*e*. The outer portion 2*b* of the left first surface 2 (e.g., the region of the left first surface 2 that extends beyond the right first surface 4) may then be folded or rotated towards the portion 130 of the back surface 6, as shown in phantom in FIG. 8*f*, until the flange 120 is flush with right edge 8 (FIG. 8*g*), forming a box-like acoustical product. Although the exemplary embodiment described above and illustrated in FIGS. 8*a*-8*g* are directed towards a box-like acoustical product, it is to be noted that the acoustical substrate 10 may be scored, compressed, or cut in locations that result in an acoustical product that has a parallelepipedic structure (other than illustrated box-like structure) or other structure having a polygon cross-sectional configuration.

The outer portion 2*b* of the left first surface 2 may be held in a folded configuration by heat molding or by an adhesive. In addition, when the outer portion 2*b* is completely rotated, a void 138 surrounded by the uncompressed regions 121, 123, 132, and 125 is formed. As illustrated in FIG. 8*g*, the decorative design located on the left first surface 2 is now positioned on both the left side and the bottom side of the final acoustical product 140 and the design on the right first surface 4 is now positioned on the right side. It is to be noted that if the decorative design was also located on the left edge 7, the final acoustical product 140 would contain a decorative design completely covering all four sides of the final product 140.

Figure 9A:
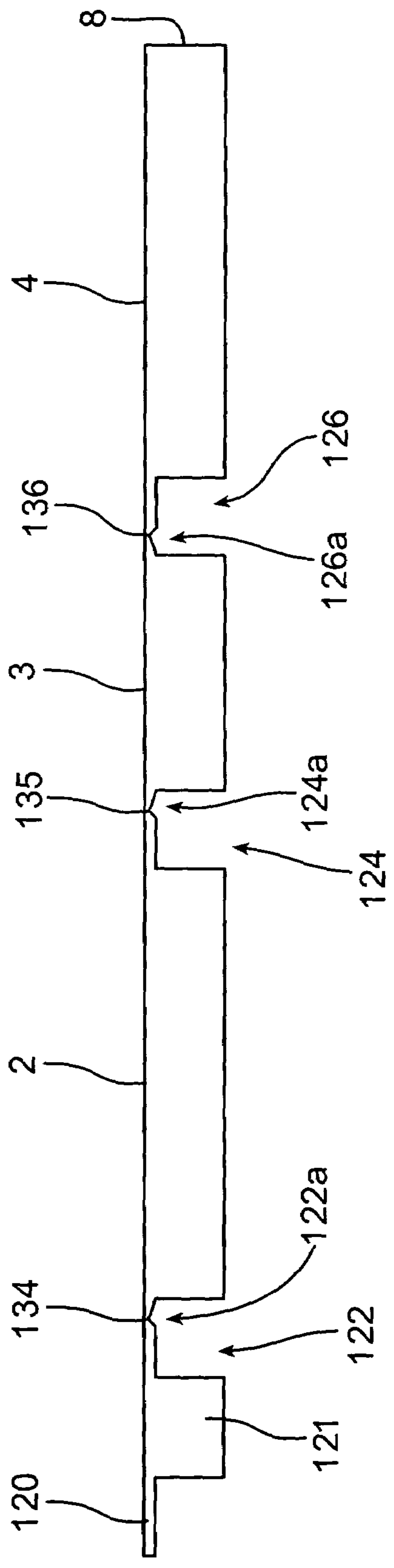
FIGS. 9*a* and 9*b* are schematic illustrations depicting an alternative embodiment of the method of FIGS. 8*a*-8*g* in which notches are cut into the acoustical substrate.
Figure 9B:
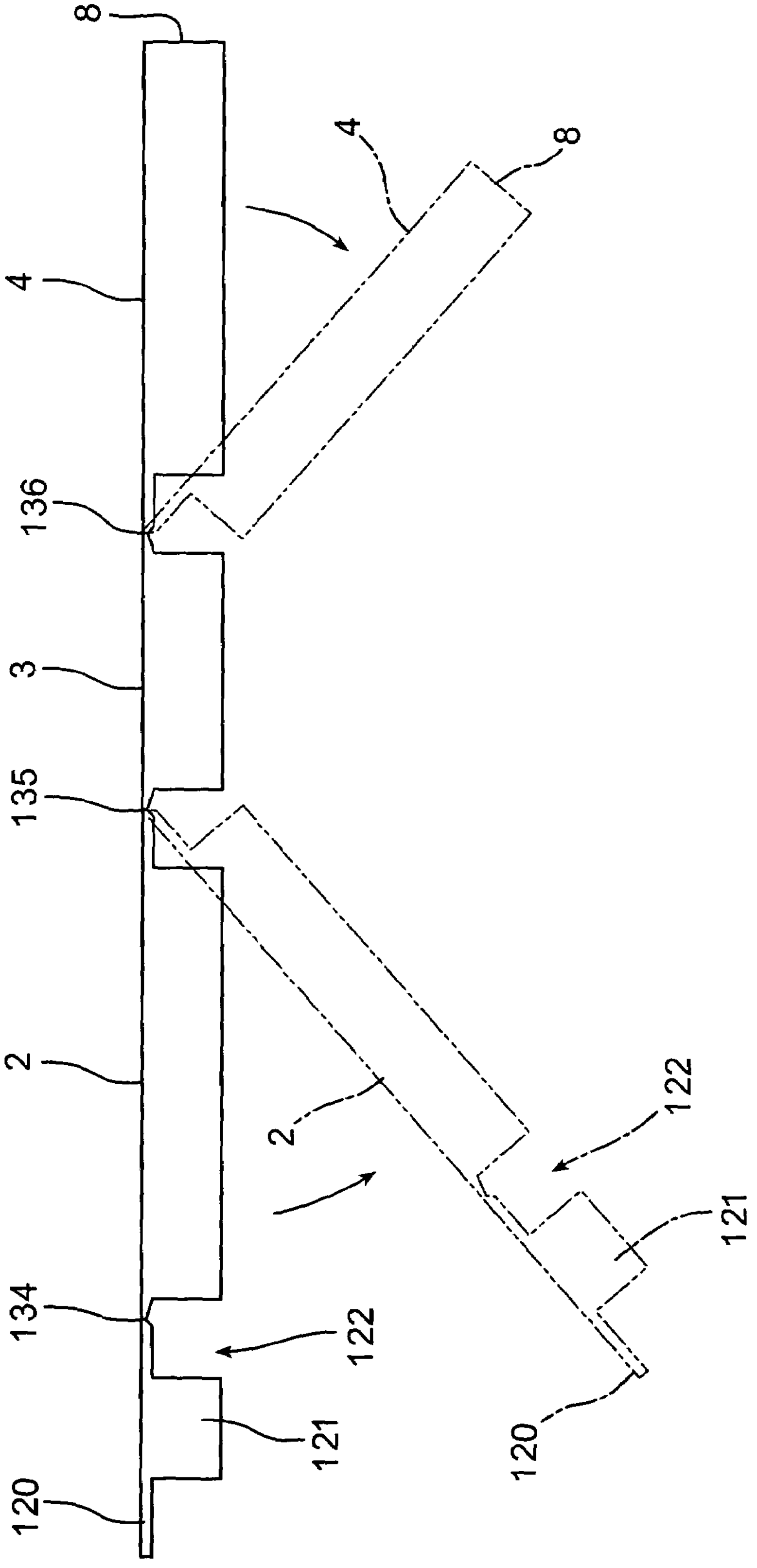

To facilitate the rotation of the left first surface 2, the right first surface 4, and the outer portion 2*b* of the left first surface 2, portions of the acoustical substrate 10 may be removed or compressed to provide fold points about which the rotating regions can fold. Such an alternate embodiment is depicted in FIGS. 9*a*-9*b*. As illustrated in FIG. 9*a*, first, second, and third notches 122*a*, 124*a*, and 126*a* may be formed in the acoustical substrate 10. The first, second and third notches 122*a*, 124*a*, and 126*a* may be formed by removing material from the acoustical substrate 10 such as by with a "V" groove molding wheel, a conventional blade or saw, by heat melting the fibers, or by compressing the portions of the acoustical substrate 10 at desired fold points. The first notch 122*a* provides a first fold point 134 (shown in FIG. 9*a*) for the rotation of the outer portion 2*b* (similar to that shown in FIG. 8*f*), the second notch 124*a* provides a second fold point 135 (shown in FIG. 9*a*) for the rotation of the left first surface 2 (shown in FIG. 9*b*), and the third notch 126*a* provides for a third fold point 136 for the rotation of the right first surface 4 (shown in FIG. 9*b*). In particular, the outer first surface 2*b* may be rotated about the first fold point 134, the left first surface 2 may be rotated about the second fold point 135, and the right first surface 4 may be rotated about the third fold point 136 to form the final acoustical product 140. By beveling portions of the acoustical substrate 10, the folded regions come together to form a clean corner.

The final acoustical product 140 shown in FIG. 8*g* may be used as an acoustical absorber or trap, a duct, a duct liner, or an outer covering for a duct. When the final acoustical product is utilized as a duct or as a liner for a duct, an air impermeable layer (not shown) such as a sheet of foil or a solid polymer sheet, may be positioned on the back surface 6, on the first surface 5, or under a decorative veil affixed to the first surface 5 of the acoustical substrate 10. Placing the impermeable layer on the back side 6 positions the impermeable layer on the inside of the final acoustical product 140 (e.g., surrounding the void 138). Placing the impermeable layer on the first surface 5 positions the impermeable layer on the outside of the final acoustical product 140 such that it extends peripherally around the final acoustical product 140. In addition, the solid polymer sheet may contain one or more fire retardants. It is to be noted that the acoustical substrate may not include a design.

Due to the compression and folding of the fibers in the acoustical substrate during the formation of sides of the final acoustical products, the sides or peripheral edges of the final acoustical products are reinforced, have increased strength and/or stiffness, and have densities that are greater than the non-compressed regions. As a result, the final acoustical products do not have to have an adhesive applied to the edges or sides to strengthen and harden the edge; the compressed fibers provide the requisite strength and/or stiffness for each of the final acoustical products. Additionally, unlike many conventional acoustic products, the inventive acoustical products do not need to be placed into a frame. The final acoustical products may be placed directly onto a mounting surface. Furthermore, the final acoustical products may have varying densities throughout its structures due to the compression and folding of the various portion of the acoustical substrate. In addition, by compressing the acoustical substrate and not excising material, thereby minimizing waste disposal.

Although the inventive methods described above form final acoustical products that have substantially square corners, other shapes may be molded by conventional methods from the final acoustical products, such as by heat molding. Alternatively, the acoustical substrate 10 may be scored or cut in locations that result in edges that have a geometric shape other than square or rectangular. Such locations are considered to be within the purview of this invention.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming a box-like acoustical product comprising:

scoring an acoustical substrate along a plurality of score lines to form a plurality of compression regions, said acoustical substrate having a major side and a back side opposing said major side;

compressing said compression regions to form first, second, and third compressed regions having four uncompressed regions adjacent thereto, said uncompressed regions including a first uncompressed region, a second uncompressed region, a central uncompressed region, and a fourth uncompressed region, said central uncompressed region being located between said second and fourth uncompressed regions, wherein said first, second, and third compressed regions have densities that are greater than densities of said first, second, central and fourth uncompressed regions;

rotating said first and second uncompressed regions toward said back side of said acoustical substrate to locate said second compressed region against said central uncompressed region;

rotating said fourth uncompressed region toward said back side of said acoustical substrate to locate said third compressed region against said central uncompressed region; and rotating said first uncompressed region toward said back side of said acoustical substrate to locate said first compressed region against said second uncompressed region and forming said box-like acoustical product.

2. The method of claim 1, wherein said acoustical product is formed with a central void therein defined by said first, second, central and fourth uncompressed regions.

3. The method of claim 1, wherein said compressing step forms a flange adjacent said first uncompressed region, said flange being flush with said fourth uncompressed region after said step of rotating said first uncompressed region.

4. The method of claim 1, further comprising the step of:

removing a portion of each of said compressed regions to define fold points to facilitate rotation of said uncompressed regions toward said back side of said acoustical substrate.

5. The method of claim 4, wherein said removed portions are V-shaped notches which collapse during the corresponding said rotating step.

6. The method of claim 1, wherein each said rotating step undertakes an angular displacement of approximately ninety degrees.

7. The method of claim 1, further comprising the step of:

positioning an air impermeable layer on said major side of said acoustical substrate.

8. The method of claim 7, further comprising the step of:

placing a decorative surface on said impermeable layer to give said box-like acoustical product an aesthetically pleasing surface.

9. The method of claim 7, wherein said box-like acoustical product is a member selected from the group consisting of an acoustical trap, a duct, a duct liner and a duct cover.

10. The method of claim 1, wherein said major side has a decorative surface, and wherein said rotating steps place said decorative surface on each side of said acoustical product.

11. A method of forming an acoustical product comprising:

compressing selected regions from an acoustic substrate to form a plurality of compressed regions and uncompressed regions, said plurality of compressed regions having densities greater than densities of said uncompressed regions;

moving a first portion of said substrate at a first said compressed region through an angular displacement to move a first uncompressed region;

rotating a second portion of said substrate at a second said compressed region to rotate a second uncompressed region such that a central uncompressed region is positioned between said first and second compressed regions, said second portion being rotated through an angular displacement in a direction opposite from said moving step;

pivoting a sub-portion of said first portion relative to the remaining part of said first portion at a third said compressed region through an angular displacement to locate a third uncompressed region relative to said first uncompressed region; and repeating said pivoting step, if said pivoting step does not form an enclosed structure, until a last pivoted uncompressed region is positioned adjacent said second uncompressed region to form an enclosed said acoustical product.

12. The method of claim 11, wherein said pivoting step places said third uncompressed region against said second uncompressed region to form an enclosed box-like acoustical product.

13. The method of claim 12, further comprising the step of:

forming an interior void within said box-like acoustical product, said void being surrounded by said uncompressed regions.

14. The method of claim 13, further comprising the step of:

applying an air impermeable layer to a major side of said acoustic substrate.

15. The method of claim 12, further comprising the step of:

placing a plurality of score lines into a back side of said acoustic substrate to define said selected regions between said score lines.

16. The method of claim 15, wherein said compressing step forms a flange adjacent said first uncompressed region, said flange being flush with said third uncompressed region after said pivoting step.

* * * * *